Jan. 14, 1947.

H. RAYMOND 2,414,169

ROPE SERVER

Filed Jan. 5, 1945

Inventor
Henry Raymond,

Patented Jan. 14, 1947

2,414,169

UNITED STATES PATENT OFFICE 2,414,169

ROPE SERVER

Henry Raymond, Sturgeon Bay, Wis.

Application January 5, 1945, Serial No. 571,395

4 Claims. (Cl. 242—96)

The present invention relates to a new and useful improvement in devices for serving or winding wire, cord about a rope to protect the rope from chafing as well as to protect the rope from injury or deterioration by the elements.

An important object of the present invention is to provide a device of this character by means of which the wire or cord may be held taut while the same is wound about the rope.

More specifically, the invention embodies a support for a reel on which the wire or cord is wound and to be payed out therefrom together with tensioning means carried by the reel support for maintaining the payed out wire or cord in a taut position.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
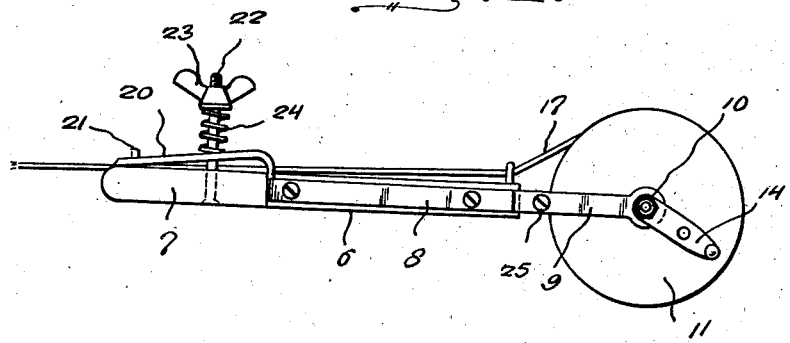
Figure 1 is a side elevational view.
Figure 2:
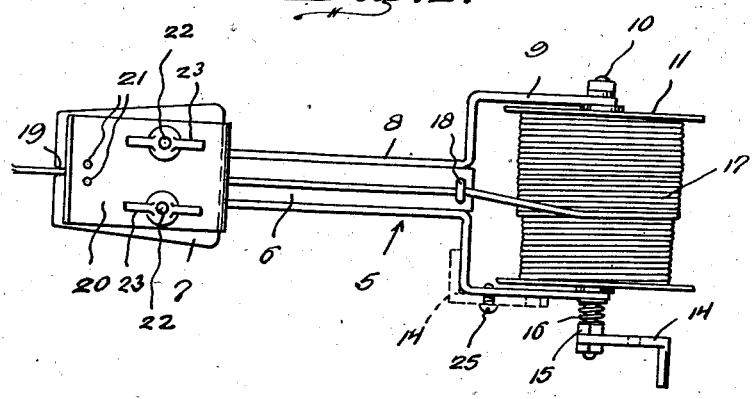
Figure 2 is a top plan view.
Figure 3:
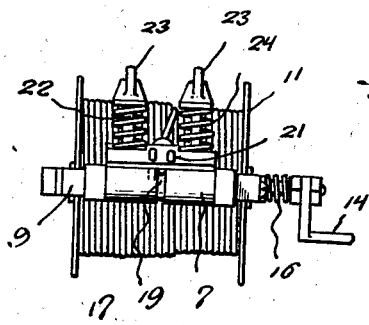
Figure 3 is a front elevational view.

Referring now to the drawing in detail wherein for the purpose of illustration I have disclosed a preferred embodiment of the invention, the numeral 5 designates a reel holder generally which comprises a handle portion 6 having an enlarged flat plate 7 formed at one end thereof.

A pair of arms 8 are attached at the opposite sides of the handle 6 and are formed with laterally offset extensions 9 projecting in spaced parallel relation from the end of the handle opposite from the plate 7 to provide a reel support in which the shaft 10 of a reel 11 is journaled.

A crank handle 14 is detachably secured on one end of the shaft by means of nuts 15 and between the nuts 15 and the adjacent side of the reel support is a coil spring 16 securing the reel against idle rotation. The handle is adapted to wind a wire or cord 17 on the reel 11.

The wire or cord is payed out through a guide 18 carried by the handle 6 adjacent the reel support, the wire or cord then extending longitudinally on top of the handle and seated in a groove 19 formed in the upper surface of the plate 7.

A clamping plate 20 is positioned on top of the plate 7, the plate 7 having a pair of upstanding pins 21 on which the front end of the clamping plate 20 is slidably mounted and a pair of bolts 22 rise from the plate 7 adjacent the inner portion thereof and on which the clamping plate 20 is also slidably mounted, the bolts 22 having wing nuts 23 threaded thereon for adjusting the tension of coil springs 24 mounted on the bolts and positioned between the clamping plate 20 and the wing nut whereby to yieldably maintain the clamping plate 20 in clamping engagement with the plate 7 to frictionally hold the wire or cord 17 between said plate and to maintain the same in a taut position while paying out or unwinding the same from the reel.

In the operation of the device the free end of the wire or cord is used to wrap around a rope to form a protective covering for the rope, the handle 6 being gripped by the operator and the handle and reel 11 bodily turned around the rope during the serving thereof.

During the serving action the handle 14 is removed and attached to one of the extensions 9 of the reel support by means of a screw 25.

The tension of the springs 24 may be regulated by adjusting the wing nuts 23 whereby to adjust the frictional engagement of the plate 20 with the cord.

It is believed that the details of construction, manner of operation and advantages of the device will be readily understood from the foregoing without further detailed explanation.

Having thus described the invention, what I claim is:

1. A rope server of the class described comprising a handle, means for rotatably mounting a reel at one end of the handle for winding and unwinding a serving cord thereon, said cord extending longitudinally of the handle, means at the other end of the handle for frictionally engaging the cord during the unwinding thereof to maintain the cord in a taut condition, a detachable hand grip, and means to mount said grip on said first-mentioned means or on said reel.

2. A rope server of the class described comprising a handle, means for rotatably mounting a reel at one end of the handle for winding and unwinding a serving cord thereon, said cord extending longitudinally of the handle, cooperating clamping members at the other end of the handle adapted for frictional clamping engagement with the cord during the unwinding thereof from the reel to maintain the cord in a taut condition, a detachable hand grip, and means to mount said grip on said first-mentioned means or 3. A rope server of the class described comprising a handle, means for rotatably mounting a reel at one end of the handle for winding and unwinding a serving cord thereon, said cord extending longitudinally of the handle, a fixed plate at the other end of the handle along which the cord is adapted to travel during its unwinding action and a spring-biased clamping plate guided by said fixed plate and adapted to frictionally clamp the cord therebetween.

4. A rope server of the class described comprising a handle, means for rotatably mounting a reel at one end of the handle for winding and unwinding a serving cord thereon, said cord extending longitudinally at the handle, a fixed plate at the other end of the handle and having a groove in one surface thereof adapted to receive the cord, pins rising from said plate, a clamping plate slidably mounted on said pins and spring means for urging said clamping plate into frictional engagement with the cord.

HENRY RAYMOND.